March 19, 1940.　　　F. C. WORTH　　　2,194,240
PROJECTION APPARATUS FOR COLORED TRANSPARENCIES OR THE LIKE
Filed July 11, 1938　　　6 Sheets-Sheet 1

Inventor
Francis C. Worth.
By F. R. Bryant
Attorney.

March 19, 1940. F. C. WORTH 2,194,240
PROJECTION APPARATUS FOR COLORED TRANSPARENCIES OR THE LIKE
Filed July 11, 1938 6 Sheets-Sheet 4

Fig. 7.

Inventor
Francis C. Worth.
By [signature]
Attorney.

Inventor
Francis C. Worth.

March 19, 1940. F. C. WORTH 2,194,240
PROJECTION APPARATUS FOR COLORED TRANSPARENCIES OR THE LIKE
Filed July 11, 1938 6 Sheets-Sheet 6

Inventor
Francis C Worth.
By
T. A. Bryant
Attorney.

Patented Mar. 19, 1940

2,194,240

UNITED STATES PATENT OFFICE

2,194,240

PROJECTION APPARATUS FOR COLORED TRANSPARENCIES OR THE LIKE

Francis C. Worth, Brooklyn, N. Y.

Application July 11, 1938, Serial No. 218,662

11 Claims. (Cl. 88—28)

This invention relates to certain new and useful improvements in projection apparatus for colored transparencies or the like.

The primary object of the invention is to provide a projection apparatus for colored transparencies or the like which will also show black and white transparencies, the apparatus being especially designed for advertising and educational purposes and when used for advertising purposes such as by travel agencies, scenes in different countries and especially points of interest therein will be displayed.

A further object of the invention is to provide projection apparatus of the foregoing character comprising an endless chain of transparency holders or links movable in a horizontal path with the holders of the endless chain connected together at adjacent vertical ends for hinged or swinging movements in opposite directions, the transparency holders being sequentially movable across a projection lamp for the display of a transparency or the like upon a screen or other background.

It is a further object of the invention to provide an electric motor with switch and resistance devices controlling the activity of the projection lamp and the movement of an endless chain carrying the transparencies, the motor idling in the presence of resistance in the electric circuit during activity of the lamp with the endless chain at rest, the switch being operated to cut off the projection lamp and reduce the resistance, causing increased speed of the motor and the operation of the endless chain for the changing of the projection of the transparency when the projection lamp is cut off.

It is a further object of the invention to provide a novel construction of feed device for the endless chain carrying the transparencies to be projected with a specially constructed guide channel for the transparency holders of the endless chain for the stacking of a series of transparency holders of the endless chain to increase the capacity for display.

With the above and other objects in view that will become apparent as the nature of the invention is better understood, the same consists in the novel form, combination and arrangement of parts hereinafter more fully described, shown in the accompanying drawings and claimed.

Figure 1:
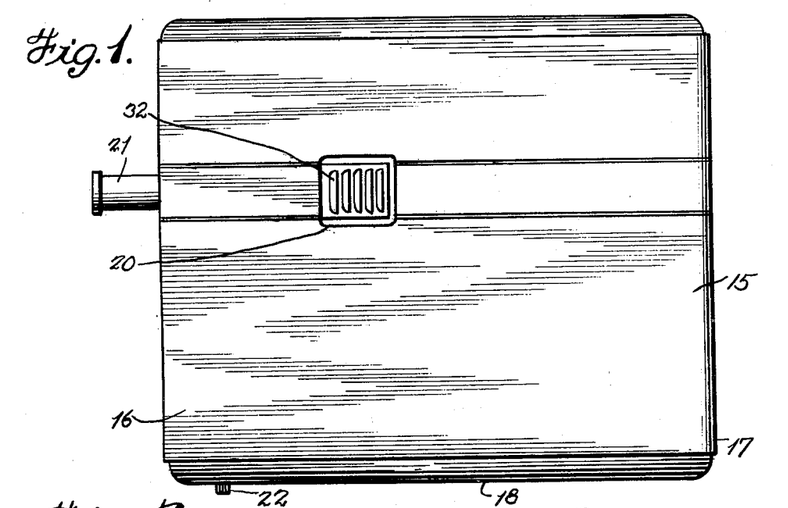
Figure 1 is a top plan view of a casing structure housing the projection apparatus for colored transparencies or the like and showing a ventilator in the top wall thereof above the lamp projector casing.
Figure 2:
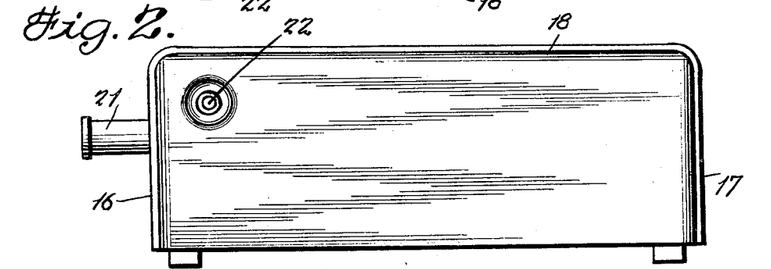
Figure 2 is a side elevational view showing the control switch for the mechanism.
Figure 3:
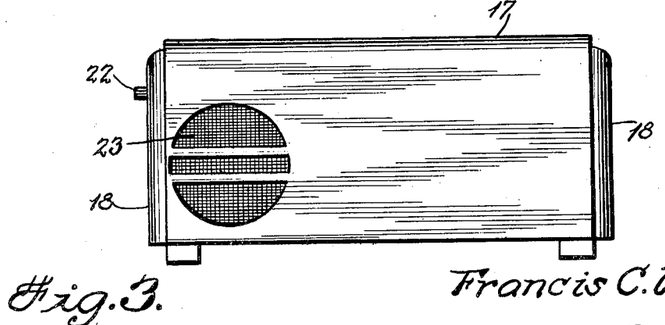
Figure 3 is a rear elevational view showing a ventilator opening in the rear wall of the casing.
Figure 4:
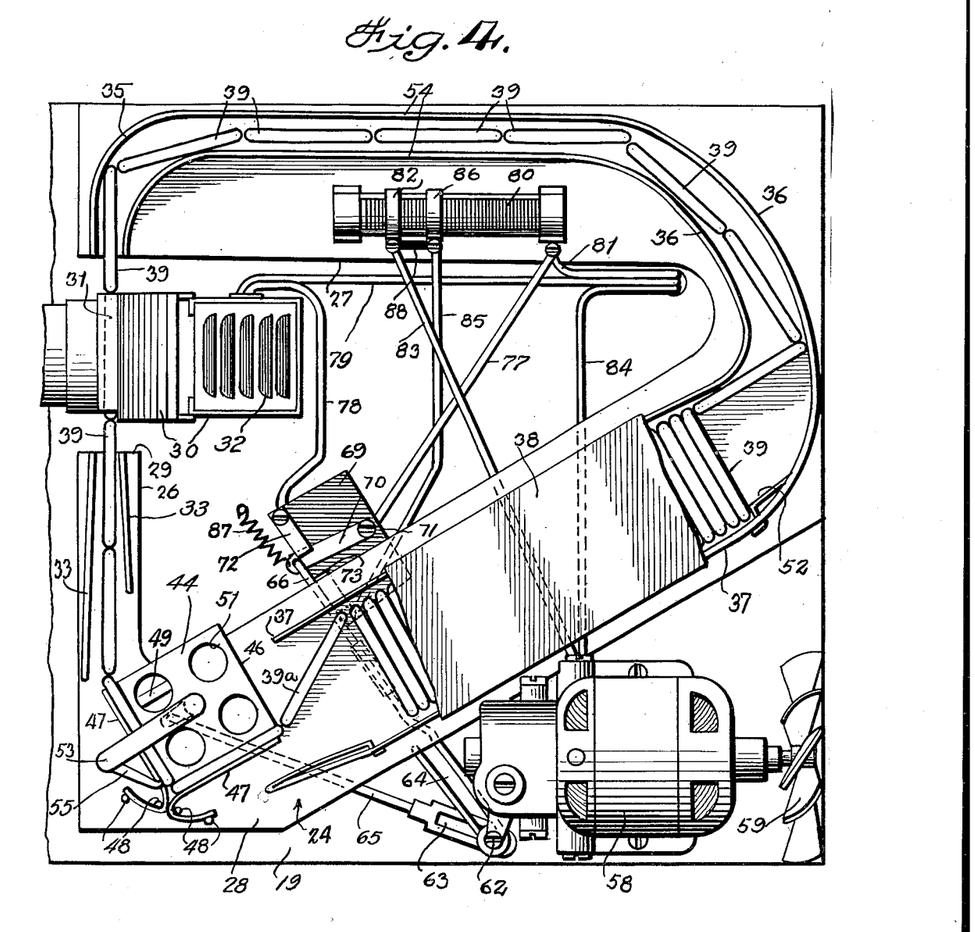
Figure 4 is a fragmentary top plan view with the cover of the casing removed to illustrate the projection apparatus and the channels or guides for the transparency holders of the endless chain, a section of the guide being designed to permit stacking of the transparency holders.
Figure 7:
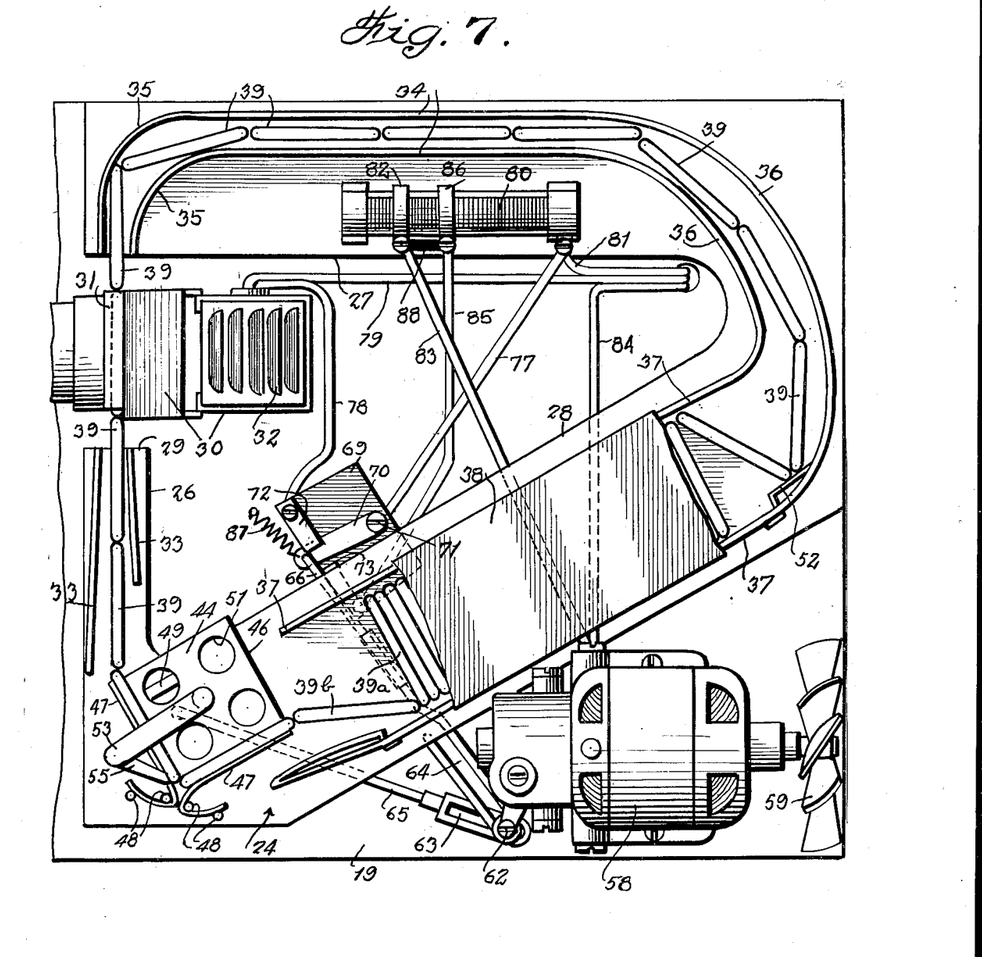
Figure 7 is a fragmentary top plan view, similar to Figure 4, showing another position of the transparency holders of the endless chain relative to the speed devices therefor.

As shown in Figures 1 to 3, the projection apparatus comprises a portable casing, preferably of generally rectangular construction and comprising a hood cover having a top wall 15, front and rear walls 16 and 17 respectively, side walls 18, the projection apparatus being mounted on a base plate 19 as shown in Figures 4 and 7 and covered by the hood cover that may be attached to the base plate in any desired manner. As shown in Figure 1, the top wall 15 of the cover is provided with a ventilator opening 20, the front wall 16 having an opening therein for the projection of the lens tube 21, a side wall 18 as shown in Figure 2 having an opening therein for the mounting of the control switch 22 for the projection apparatus while the rear wall 17 has a screened ventilator opening 23 therein in proximity of an enclosed electric motor.

Figure 8:
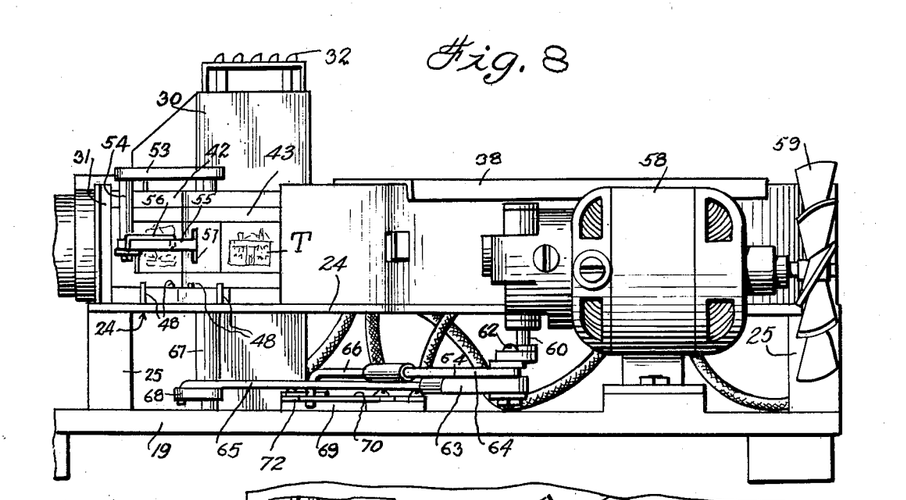
Figure 8 is a fragmentary side elevational view of a part of the apparatus showing the operative connections between the electric motor and the switch device, and the motor and the feed device for the endless chain.

An elevated skeleton platform 24 is supported above the base plate 19 by means of uprights 25 as shown in Figure 8 and a guideway or channel for an endless chain comprising holders for the transparencies is mounted upon the platform 24. As shown in Figures 4 and 7, the platform 24 is of generally triangular formation in plan view with a relatively large central opening therein, the platform 24 comprising three lineal sections 26, 27 and 28 respectively. The section 26 of the platform is parallel with the front wall 20 of the casing and as shown in Figures 4 and 7 is broken away as at 29 to provide a clearance for the mounting of a projection lamp casing 30 mounted upon the base plate 19 and having an open ended vertical guide 31 for the passage of the transparency holders. The projection lamp casing 30 is provided with a ventilated cover wall 32 that registers with the opening 20 in the top wall of the hooded cover as shown in Figure 1. The platform section 26 is comparatively narrow and has rising therefrom a pair of guide walls 33 for the endless chain and said guide walls 33 terminate in spaced relation to the adjacent forward end of the platform section 28. The platform sections 27 and 28 are of substantially the same width, being wider than the front platform section 26, the platform section 27 being parallel with and adjacent the side wall 18 of the casing and having a pair of guide walls 34 rising therefrom adjacent its outer side, the forward ends of the guide walls 34 being of arcuate formation as shown at 35 and directed toward the guide 31 of the projection casing. The rear ends of the guide walls 34 are curved as at 36 and extend in slightly diverging relation toward the rear end of the platform section 28 that extends diagonally of the base plate 19, the curved sections 36 merging into the parallel guide walls 37 rising from the platform section 28 with the guide walls 37 spaced a distance apart slightly greater than the length of each transparency holder of the endless chain, the guide walls 37 terminating at their forward ends in spaced relation to the forward end of the platform section 28. As shown in Figures 4, 7 and 8, a plate cover 38 is removably placed over the upper edge of the guide walls 37 between which a series of the holders of the endless chain are arranged in stacked relation during their sequential travel through the apparatus.

The endless chain comprising a plurality of pivotally connected holders for the transparencies to be projected is shown more clearly in Figures 4, 7, 8 and 12. The links or transparency holders designated in general by the reference character 39 comprise perpendicularly disposed flattened tubes 40 open at their upper and lower ends with large openings 41 in the side walls thereof, the holders being connected together by pairs of endless tapes 42 and 43 at the upper and lower edges thereof with each tape respectively secured to opposite faces of adjacent holders 40 so that the holders may freely pivot in opposite directions, the tape connections between the holders being similar to "falling or tumbling blocks". The endless chain is perpendicularly disposed between the guide walls rising from the platform 24, the transparency holders 39 in their travel between the guide walls 34 and 33 being substantially in a line, while the holders in their travel between the guide walls 37 above the platform section 28 are caused to move in parallel or stacked relation so that an endless chain of increased or decreased length carrying a greater or lesser number of holders may be employed in a smaller apparatus.

Figure 9:
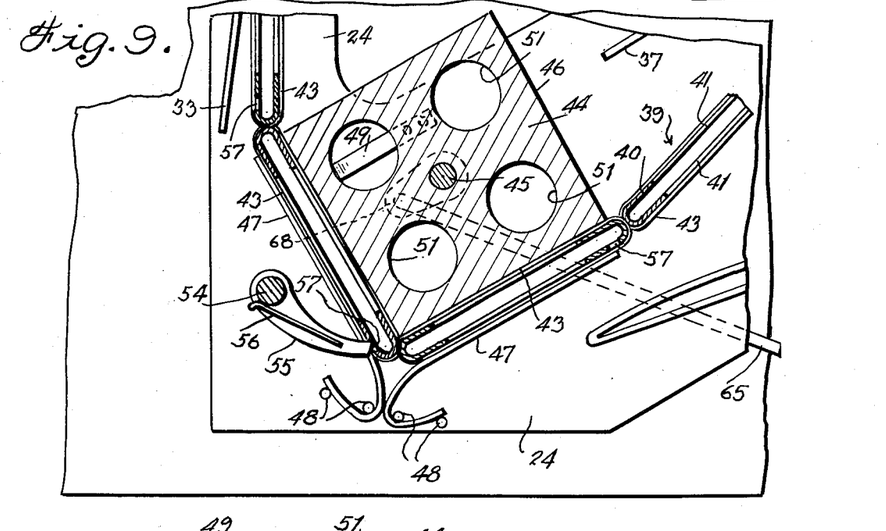
Figure 9 is a fragmentary horizontal sectional view showing the polygonal rotatable feed blocks for the transparency holders of the endless chain and the latch arm for moving the transparency holders and rotating the blocks.
Figure 10:
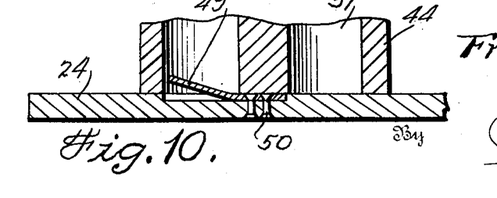
Figure 10 is a fragmentary vertical sectional view of the lower end of the feed or guide blocks for the transparency holders of the endless chain, showing the spring device associated with the blocks for preventing retrograde rotation thereof.

For arranging the transparency holders 39 in parallel or stacked relation between the guide walls 37, a polygonal guide block 44 is horizontally rotatable on a perpendicular shaft 45 rising through the platform section 28 at the forward end thereof between the adjacent spaced ends of the guide walls 33 and 37, each side face 46 of the polygonal block being of substantially the same length as a transparency holder 40. To maintain the transparency holders firmly engaged with the side faces 46 of the rotatable block 44, a pair of spring arms 47 have corresponding ends thereof engaged with pins 48 carried by the forward end of the platform section 28 as shown in Figures 4, 7 and 9 with the free tensioned ends of the spring arms 47 positioned for engagement with a pair of adjacent transparency holders 39 respectively engaged with a pair of adjacent side faces of the rotatable block 44 being freely mounted upon the perpendicular shaft 45, retrograde movement thereof is prevented by means of a spring catch 49 secured as at 50 to the upper side of the platform section 28 beneath the block 44 with the free end of the spring 49 engageable with a wall of a series of perpendicular openings 51 in said block. Upon rotation of the block 44 by devices to be presently described, the transparency holders 49 are arranged in parallel and stacked relation as shown in Figures 4 and 7, the transparency holder 39a, shown in Figure 4, having its forward end disposed adjacent the inner guide wall 37 so that upon subsequent rotation of the block 44, the holder 39a will have its rear end disposed adjacent the outer guide wall 37 as shown in Figure 7, while the next transparency holder 39 that has its forward end adjacent the outer guide wall 37 will have the rear end thereof positioned adjacent the inner guide wall 37, the adjacent holders hinging in opposite directions while being assembled in stacked relation between the guide walls 37. The spring device 52 carried by the outer guide wall 37 at its point of mergence with the arcuate guide wall 36 operates to unfold the stack of transparency holders 39 as will be readily understood from an inspection of Figures 4 and 7.

The positive feeding of the endless chain is shown more clearly in Figures 4, 7, 9 and 11, a horizontal laterally directed arm 53 being secured to the upper end of the driven shaft 45 above the polygonal block 44 with the free end of the arm 53 projecting laterally of the block and carrying a depending leg 54 upon the lower end of which a horizontally swinging pawl 55 is pivotally mounted and tensioned in a direction toward the transparency holders by means of the spring 56. The free end of the pawl 55 is engageable in a notch or cut-out 57 in an end of each holder 40, rotation of the shaft 45 moving the arm 53 and pawl 55 and causing the block 44 to rotate on said shaft by the engagement with the block of the transparency holders of the chain.

Figure 11:
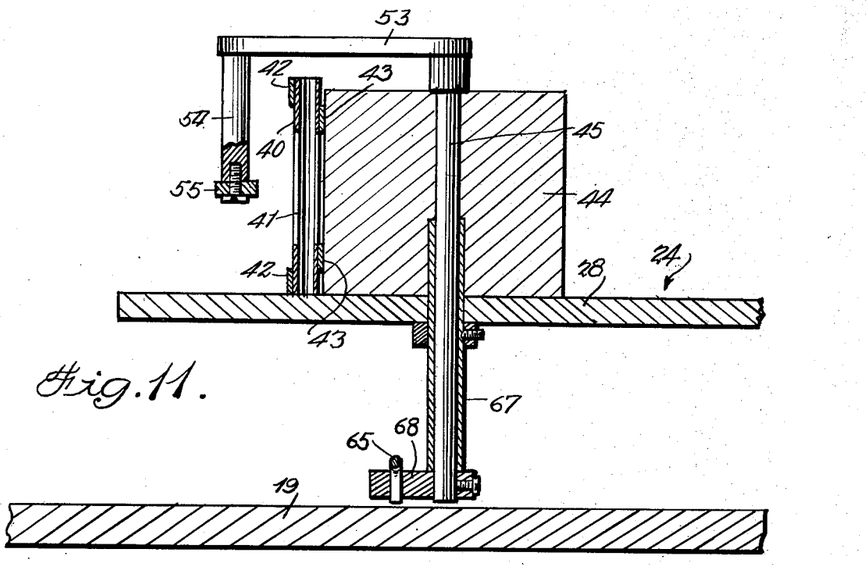
Figure 11 is a fragmentary vertical sectional view showing the motor driven shaft rotatably extending perpendicularly through the feed guide blocks and the arm carried thereby for the support of the latch to feed the endless chain.
Figure 12:
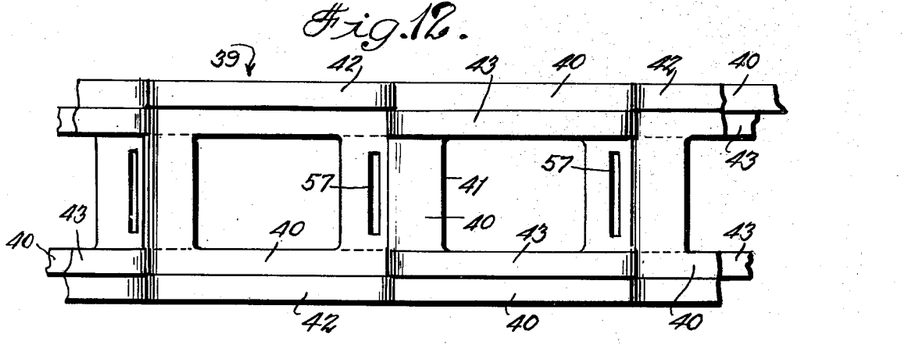
Figure 12 is a fragmentary side elevational view of the endless chain comprising the holders for the transparencies, the holders constituting the links being connected together by endless tapes similar to "tumbling blocks"

The apparatus includes an electric motor to effect reverse rotation of the shaft 45 and for controlling the operation of a switch device for the projection lamp in the projection casing 30. The electric motor 58 as shown in Figures 4, 7 and 8, carries upon the shaft thereof at one end a fan 59, the motor being mounted upon the base plate 19 laterally of the rear end of the platform section 28 with the fan 59 disposed adjacent the ventilator opening 23 in the rear wall 17 in the casing, the other end of the motor 58 carrying a gear box that has a depending perpendicular driven shaft 60, the shaft 60 as shown also in Figures 5 and 6, carrying a laterally directed horizontal arm 61, the free end of which carries a pin 62 working in the slotted ends 63 and 64 of a pair of rods 65 and 66 respectively, the rod 65 being associated with the perpendicular shaft 45 while the other end of the rod 66 that has an insulation turn-buckle 66a thereon is associated with a switch device. As shown in Figure 11, the shaft 45 is journalled in a bearing sleeve 67 extending upwardly through the platform section 28 and into an opening in the lower face of the polygonal block 44, the lower end of the shaft 45 projecting below the tubular bearing 66 and having a laterally directed horizontal arm 68 anchored thereto and to which the adjacent end of the rod 65 is pivotally attached. A switch device comprising an insulation plate 69 is secured to the upper face of the base plate 19, one end of a switch blade 70 being pivotally attached as at 71 to the insulation plate 69 while the other end of the switch blade 70 is pivotally attached to the adjacent free end of the rod 66. The switch blade 70 is selectively engageable with a pair of terminals 72 and 73.

Figure 5:
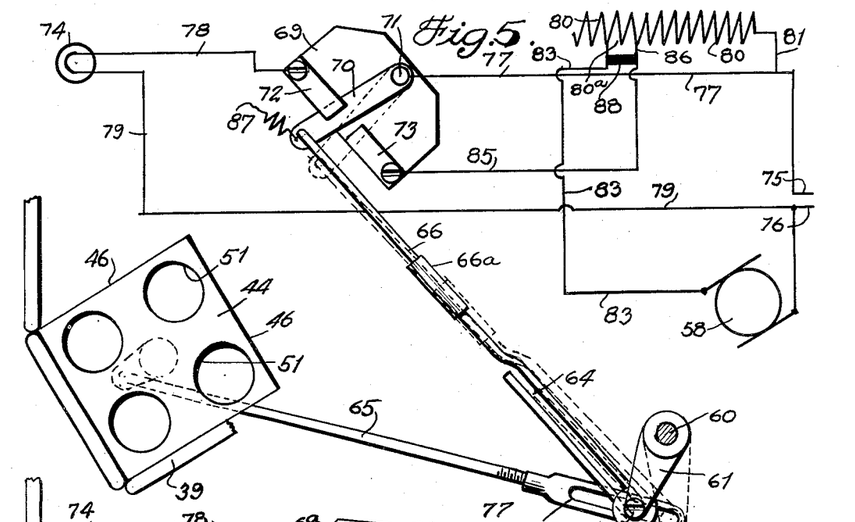
Figure 5 is a diagrammatic plan view showing the electrical devices including the motor, the double switch controlling the operation of the projection lamp and speed of the motor together with a part of the feed mechanism for the endless chain, the switch being illustrated by full lines for closing the electric circuit to the projection lamp and in dotted lines with resistance cut out to speed the motor.
Figure 6:
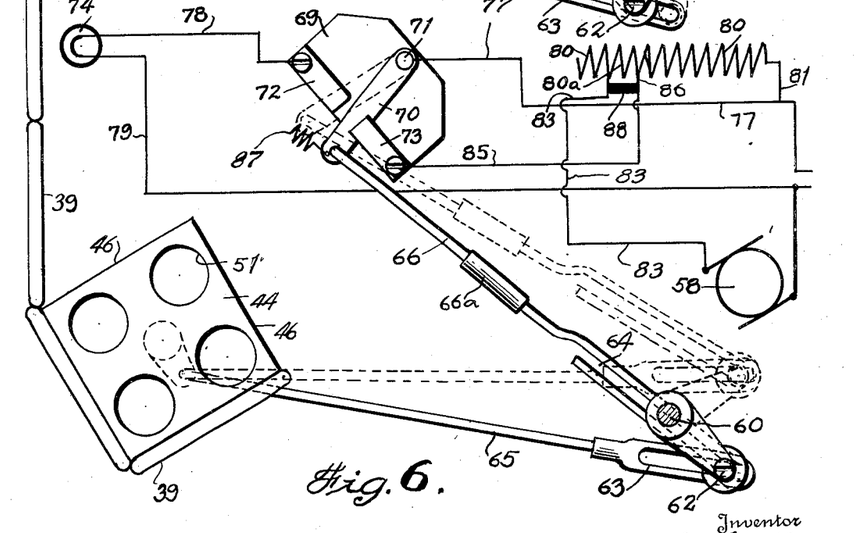
Figure 6 is a diagrammatic view, similar to Figure 5, the full line position of the switch cutting out resistance to the motor and speeding movement of the latter with the circuit to the projection lamp broken, the dotted line position showing the circuit to the projection lamp closed, resistance thrown in and the speed of the motor retarded.
Figure 13:
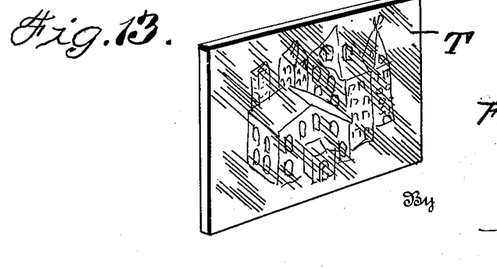
Figure 13 is a perspective view of a transparency for removable insertion in one of the links or holders of the endless chain.

Electric current from a suitable source of supply supplies energy for the operation of the motor 58 and the illumination of the lamp 74 in the projection casing 30 and as shown in Figures 4 to 8, a pair of conductor wires 75 and 76 extending from a source of energy includes a wire 77 extending from the conductor wire 75 to the pivoted end of the switch blade 70, current flowing through the switch blade 70 to the terminal 72 when the switch blade is engaged therewith, the wire 78 from the terminal 72 leading to the lamp 74 while the return wire 79 from the lamp communicates with the conductor wire 76, it being noted that when the switch blade 70 is in the full line position shown in Figure 5 and the dotted line position shown in Figure 6, current flows to the lamp 74 for the illumination thereof. When the projection lamp is in operation, it is desirable to run the motor 58 at a comparatively slow speed as the endless chain carrying the transparency holders is idle during illumination of the lamp with one of the holders carrying a transparency T as shown in Figure 13 in the guide 31 of the projection apparatus for display upon a screen or the like. A resistance element 80 is supported upon the platform section 27 inwardly of the chain guide as shown in Figures 4 and 7 and current for the operation of the motor 58 flows over the conductor wire 75, the wire 70 to the branch 81 where the same passes to the resistance element 80 to leave the resistance 80 by way of the contact 82 to flow over the wire 83 to the motor 58 and from the motor 58 by way of the wire 84 to the conductor wire 76, the full length of the resistance 80 between the wire 81 and the contact 82 causing the motor 58 to travel at a relatively low speed while the switch blade 70 is engaged with the terminal 72 for the illumination of the lamp 74. During rotation of the motor driven shaft 60, the laterally directed arm 61 carried thereby is movable through the slotted ends 63 and 64 of the rods 65 and 66 respectively, these parts being so related that the rod 65 is ineffective for operating the tensioned pawl 55 during the arrested movement of the endless chain for the projection of a transparency. When the shaft 60 has reached a certain point in its rotation, a pull is exerted on the rod 66 to move the switch blade 70 out of contact with the terminal 72 and into engagement with the terminal 73, the circuit to the lamp 74 being then broken while the flow of current to the motor 58 is then by way of the conductor wire 75, the wire 77 to the switch blade 70, terminal 73 and wire from the terminal 73 to the contact 86 engaged with the resistance 80, current flowing through a comparatively short section 80a of the resistance 80 to the contact 82 and wire 83 to the motor 58 and wire 84 to the conductor wire 76, the relatively short resistance section 80a permitting an increased speed of the motor 58 for the operation of the shaft 45 and tensioned pawl 55 for the shifting of the positions of the transparent holders of the endless chain, the connections of the shaft 60 with the adjacent ends of the rods 65 and 66 being so timed as to arrest speeding activity of the tensioned pawl 55 as soon as the preceding or following transparency holder has been received in the guide 31 of the projection casing 30 and these parts have assumed such position that the switch blade 70 is again restored into engagement with the terminal 72 for the illumination of the projection lamp 74, assisted by the coil spring 87 having one end anchored to the base plate 19 and its other end attached to the free end of the switch blade 70. As shown in Figures 4 and 7, the contacts 82 and 86 are connected together by an insulation block 88 and are unitarily movable around the resistance element 80 for varying the speed of the motor for the operation of the switch 70 during the idling period of the endless chain.

From the above detailed description of the invention, it is believed that the construction and operation thereof will at once be apparent and while there is herein shown and described the preferred embodiment of the invention, it is nevertheless to be understood that minor changes may be made therein without departing from the spirit and scope of the invention as claimed.

I claim:

1. In projection apparatus of the character described, an endless chain comprising a plurality of hingedly connected holders for transparencies or the like, said holders being vertically disposed, guides for the endless chain, one of said guides being of a width slightly greater than the length of a holder and adapted to have the holders folded and stacked therein in flat engagement with each other during travel of the endless chain, a projection casing through which the holders sequentially pass, a lamp in said casing means for feeding the holders in a step-by-step movement through the projection casing, including a rectangular block rotatable on a vertical oscillatable axle with the holders movable into flat engagement with the sides of the block, ratchet means carried by said axle and engageable with said holders for moving said holders through the projection casing and into the guide for stacking, said block being so located relative to the guide for stacking to effect folding the holders in the wider section of the guide, and electrically operated means for rendering the projection lamp inactive during operation of the feeding means for the holders.

2. In projection apparatus of the character described, an endless chain comprising a plurality of hingedly connected holders for transparencies or the like, said holders being vertically disposed, guides for the endless chain, one of said guides being of a width slightly greater than the length of a holder and adapted to have the holders folded and stacked therein in flat engagement with each other during travel of the endless chain, a projection casing through which the holders sequentially pass, a lamp in said casing means for feeding the holders in a step-by-step movement through the projection casing, including a rectangular block rotatable on a vertical oscillatable axle with the holders movable into flat engagement with the sides of the block, ratchet means carried by said axle and engageable with said holders for moving said holders through the projection casing and into the guide for stacking, said block being so located relative to the guide for stacking to effect folding the holders in the wider section of the guide, and electrically operated means for rendering the projection lamp inactive during operation of the feeding means for the holders, an electric motor for operating the feeding means, a source of electric energy in communication with the motor and projection casing including a plurality of electric circuits, and a switch and resistance element in said circuits with the switch operated by said motor operable to retard the speed of the motor during idling of the endless chain and activity of the projection lamp in said casing.

3. In projection apparatus of the character described, an endless chain comprising a plurality of hingedly connected holders for transparencies or the like, said holders being vertically disposed, guides for the endless chain, one of said guides being of a width slightly greater than the length of a holder and adapted to have the holders folded and stacked therein in flat engagement with each other during travel of the endless chain, a projection casing through which the holders sequentially pass, a lamp in said casing means for feeding the holders in a step-by-step movement through the projection casing, including a rectangular block rotatable on a vertical oscillatable axle with the holders movable into flat engagement with the sides of the block, ratchet means carried by said axle and engageable with said holders for moving said holders through the projection casing and into the guide for stacking, said block being so located relative to the guide for stacking to effect folding the holders in the wider section of the guide, and electrically operated means for rendering the projection lamp inactive during operation of the feeding means for the holders, each holder of the endless chain comprising a flattened tube for the removable reception of a transparency and the hinge connections between the holders including a plurality of pairs of endless tapes adhesively secured to the opposite faces of adjacent holders whereby the latter may fold in opposite directions.

4. In projection apparatus of the character described, an endless chain comprising a plurality of hingedly connected holders for transparencies or the like, said holders being vertically disposed, guides for the endless chain, one of said guides being of a width slightly greater than the length of a holder and adapted to have the holders folded and stacked therein in flat engagement with each other during travel of the endless chain, a projection casing through which the holders sequentially pass, a lamp in said casing means for feeding the holders in a step-by-step movement through the projection casing, including a rectangular block rotatable on a vertical oscillatable axle with the holders movable into flat engagement with the sides of the block, ratchet means carried by said axle and engageable with said holders for moving said holders through the projection casing and into the guide for stacking, said block being so located relative to the guide for stack'ng to effect folding the holders in the wider section of the guide, and electrically operated means for rendering the projection lamp inactive during operation of the feeding means for the holder, an electric motor for operating the feeding means, a source of electric energy in communication with the motor and projection casing including a plurality of electric circuits, and a switch and resistance element in said circuits with the switch operated by said motor operable to retard the speed of the motor during idling of the endless chain and activity of the projection lamp, each holder of the endless chain comprising a flattened tube for the removable reception of a transparency and the hinge connections between the holders including a plurality of pairs of endless tapes adhesively secured to the opposite faces of adjacent holders whereby the latter may fold in opposite directions.

5. In projection apparatus of the character described, an endless chain comprising a plurality of hingedly connected holders for transparencies or the like, said holders being vertically disposed, guides for the endless chain, one of said guides being of a width slightly greater than the length of a holder and adapted to have the holders folded and stacked therein in flat engagement with each other during travel of the endless chain, a projection casing through which the holders sequentially pass, a lamp in said casing means for feeding the holders in a step-by-step movement through the projection casing, means operated by said feeding means for folding the holders in the wider section of the guide, and electrically operated means for rendering the projection lamp inactive during operation of the feeding means for the holders, the folding means including a horizontally rotatable polygonal block with vertical side faces of a width substantially the length of each holder, spring devices for holding adjacent transparency holders in flat engagement with adjacent side faces of the block and the feeding means including a tensioned pawl oscillatable through an arcuate path and sequentially engageable with a holder for moving the same in a step-by-step path.

6. In a projection apparatus of the character described, an endless chain comprising a plurality of hingedly connected holders for transparencies or the like, said holders being vertically disposed, guides for the endless chain, one of said guides being of a width slightly greater than the length of a holder and adapted to have the holders folded and stacked therein in flat engagement with each other during travel of the endless chain, a projection casing through which the holders sequentially pass, a lamp in said casing means for feeding the holders in a step-by-step movement through the projection casing, means operated by said feeding means for folding the holders in the wider section of the guide, and electrically operated means for rendering the projection lamp inactive during operation of the feeding means for the holders, an electric motor for operating the feeding means, a source of electric energy in communication with the motor and projection casing including a plurality of electric circuits, and a switch and resistance element in said circuits with the switch operated by said motor operable to retard the speed of the motor during idling of the endless chain and activity of the projection lamp, the folding means including a horizontally rotatable polygonal block with vertical side faces of a width substantially the length of each holder, spring devices for holding adjacent transparency holders in flat engagement with adjacent side faces of the block and the feeding means including a tensioned pawl oscillatable through an arcuate path and sequentially engageable with a holder for moving the same in a step-by-step path.

7. In projection apparatus of the character described, an endless chain comprising a plurality of hingedly connected holders for transparencies or the like, said holders being vertically disposed, guides for the endless chain, one of said guides being of a width slightly greater than the length of a holder and adapted to have the holders folded and stacked therein in flat engagement with each other during travel of the endless chain, a projection casing through which the holders sequentially pass, a lamp in said casing means for feeding the holders in a step-by-step movement through the projection casing, including a rectangular block rotatable on a vertical oscillatable axle with the holders movable into flat engagement with the sides of the block, ratchet means carried by said axle and engageable with said holders for moving said holders through the projection casing and into the guide for stacking, said block being so located relative to the guide for stacking to effect folding the holders in the wider section of the guide, and electrically operated means for rendering the projection lamp inactive during operation of the feeding means for the holders, an electric motor for operating the feeding means, a source of electric energy in communication with the motor and projection casing including a plurality of electric circuits, and a switch and resistance element in said circuits with the switch operated by said motor operable to retard the speed of the motor during idling of the endless chain and activity of the projection lamp, the operative connections between the motor and the feeding means and switch including a pair of divergent rods with adjacent ends slotted, a shaft driven by said motor having a pin working in said slots with limited lost motion therein, one rod being attached to the axle supporting the rectangular block and the other rod attached to said switch.

8. In projection apparatus of the character described, an endless chain comprising a plurality of hingedly connected holders for transparencies or the like, said holders being vertically disposed, guides for the endless chain, one of said guides being of a width slightly greater than the length of a holder and adapted to have the holders folded and stacked therein in flat engagement with each other during travel of the endless chain, a projection casing through which the holders sequentially pass, means for feeding the holders in a step-by-step movement through the projection casing, including a rectangular block rotatable on a vertical oscillatable axle with the holders movable into flat engagement with the sides of the block, ratchet means carried by said axle and engageable with said holders for moving said holders through the projection casing and into the guide for stacking, said block being so located relative to the guide for stacking to effect folding the holders in the wider section of the guide, a plurality of electric circuits having a lamp for the projection casing therein, a switch, resistance element and a motor in said circuits, the motor being operatively engaged with the axle rotatably supporting the block, and the switch and resistance element and said arrangement being constructed and arranged to effect retardation of the speed of the motor during illumination of the projection lamp and idling of the endless belt and to increase the speed of the motor when the projection lamp is cut off.

9. In projection apparatus of the character described, an endless chain comprising a plurality of transparency holders hingedly connected together at adjacent ends for folding in opposite directions, a guide for the endless chain, a projection casing through which the holders sequentially pass, a lamp in said casing means for feeding the holders through the projection casing in a step-by-step movement including a rectangular block rotatable on a vertical oscillatable axle with the holders movable into flat engagement with the sides of the block, ratchet means carried by said axle and engageable with said holders for moving said holders through the projection casing and into the guide for stacking, said block being so located to the guide for stacking to effect folding of the holders in the wide section of the guide, an electric motor for operating the feeding means, a source of electrical energy in communication with the motor and projection lamp and including a plurality of circuits, a double-throw switch and a resistance element in the circuits and operative connections between the electric motor and switch for controlling operation of the circuits leading to the projection casing and resistance element whereby the speed of the motor is retarded during activity of the projection lamp and idling of the feeding means and the speed of the motor increased during inactivity of the projection lamp and operation of the feeding means.

10. In projection apparatus of the character described, an endless chain comprising a plurality of hingedly connected holders for transparencies or the like, said holders being vertically disposed, guides for the endless chain, one of said guides being of a width slightly greater than the length of a holder and adapted to have the holders folded and stacked therein in flat engagement with each other during travel of the endless chain, a projection casing through which the holders sequentially pass, a lamp in said casing means for feeding the holders in a step-by-step movement through the projection casing, including a rectangular block rotatable on a vertical oscillatable axle with the holders movable into flat engagement with the sides of the block, ratchet means carried by said axle and engageable with said holders for moving said holders through the projection casing and into the guide for stacking, said block being so located relative to the guide for stacking to effect folding the holders in the wider section of the guide, electrically operated means for rendering the projection lamp inactive during operation of the feeding means for the holders, a ratchet device associated with said block for preventing reverse rotation thereof and means at the outlet end of the stacking portion of the guide for directing the unfolding movements of the holders.

11. In projection apparatus of the character described, an endless chain comprising a plurality of hingedly connected holders for transparencies or the like, said holders being vertically disposed, guides for the endless chain, one of said guides being of a width slightly greater than the length of a holder and adapted to have the holders folded and stacked therein in flat engagement with each other during travel of the endless chain, a projection casing through which the holders sequentially pass, a lamp in said casing means for feeding the holders in a step-by-step movement through the projection casing, including a rectangular block rotatable on a vertical oscillatable axle with the holders movable into flat engagement with the sides of the block, ratchet means carried by said axle and engageable with said holders for moving said holders through the projection casing and into the guide for stacking, said block being so located relative to the guide for stacking to effect folding the holders in the wider section of the guide, electrically operated means for rendering the projection lamp inactive during operation of the feeding means for the holders, an electric motor for operating the feeding means, a source of electric energy in communication with the motor and projection lamp in said casing including a plurality of electric circuits, and a switch and resistance element in said circuits with the switch operated by said motor operable to retard the speed of the motor during idling of the endless chain and activity of the projection lamp in said casing, a ratchet device associated with said block for preventing reverse rotation thereto and means at the outlet end of the stacking portion of the guide for directing the unfolding movements of the holders.

FRANCIS C. WORTH.